United States Patent
Patel et al.

(10) Patent No.: US 9,240,706 B2
(45) Date of Patent: Jan. 19, 2016

(54) ALTERNATING CURRENT (AC) SYNCHRONIZATION FOR LOAD RESTORATION

(71) Applicant: ABB Technology AG, Zurich (CH)

(72) Inventors: Shetul R. Patel, Montreal (CA); Marc Lambert, Sainte-Catherine (CA); Francois-Pierre Pepin, Montreal (CA); Philippe Lautier, Aarhus C (DK); Kurt Rothermann, Grenchen (CH); Armando Luigi Nold, Wettingen (CH)

(73) Assignee: ABB Technology AG, Zurich (CH)

( * ) Notice: Subject to any disclaimer, the term of this patent is extended or adjusted under 35 U.S.C. 154(b) by 308 days.

(21) Appl. No.: 13/790,139

(22) Filed: Mar. 8, 2013

(65) Prior Publication Data
US 2014/0252863 A1  Sep. 11, 2014

(51) Int. Cl.
*H02J 3/08* (2006.01)
*H02J 9/06* (2006.01)
*H02J 3/44* (2006.01)

(52) U.S. Cl.
CPC . *H02J 9/062* (2013.01); *H02J 3/44* (2013.01); *H02J 2009/068* (2013.01); *Y10T 307/707* (2015.04)

(58) Field of Classification Search
None
See application file for complete search history.

(56) References Cited

U.S. PATENT DOCUMENTS

| | | | |
|---|---|---|---|
| 6,362,988 B1 * | 3/2002 | Deng et al. | 363/148 |
| 7,834,479 B2 | 11/2010 | Capp et al. | |
| 2006/0221523 A1 | 10/2006 | Colombi et al. | |
| 2009/0230772 A1 | 9/2009 | Caudill | |
| 2012/0175955 A1 | 7/2012 | Carralero et al. | |
| 2012/0242295 A1 * | 9/2012 | Bech et al. | 322/87 |

OTHER PUBLICATIONS

International Search Reported for PCT/EP2014/054534, dated Apr. 13, 2015, 13pgs.
Chandrokar M C et al: "Control of Distributed UPS System" Power Electronics Specialists Conference, PESC 194 Record., 25th Annual IEEE Taipei, Taiwan Jun. 20-25, 1994, New York, NY, USA, IEEE, Jun. 20, 1994, pp. 197-204.
Yunqing Pei et al: "Auto-master-slave control technique of parallel inverters in distributed AC power systems and UPS", Power Electronics Specialists Conference, 2004. PESC 04. 2004 IEEE 35th Annual, Aachen, Germany Jun. 20-25, 2004, Piscataway, NJ, USA,IEEE, US, vol. 3, Jun. 20, 2004, pp. 2050-2053.
(Continued)

*Primary Examiner* — Jared Fureman
*Assistant Examiner* — Terrence Willoughby
(74) *Attorney, Agent, or Firm* — Cooper Legal Group, LLC

(57) ABSTRACT

Among other things, one or more techniques and/or systems are provided for synchronizing one or more direct current (DC) to alternating current (AC) power sources (e.g., a DC power source coupled to an inverter) for restoration of power to a load. That is, responsive to a grid fault of a grid used to supply power to a load over a common bus, the common bus is isolated from the grid and the load. One or more DC to AC power sources are synchronized through synchronization circuits (e.g., voltage, phase, and/or frequency synchronization) until a total power supply provided by respective synchronized DC to AC power sources is greater than or equal to a target power used to supply the load. Once the target power is achieved, a load circuit breaker is closed so that respective synchronized DC to AC power sources provide power to the load over the common bus.

20 Claims, 6 Drawing Sheets

(56) References Cited

OTHER PUBLICATIONS

"A Voltage and Frequency Droop Control Method for Parallel Inverters", K. De Brabandere, B. Bolsens, J. Van Den Keubus, A Woyte, J. Driesen and R. Belmans, 2004, in 35th Annual IEEE Power Electronics Specialists Conference, 7 pgs.

"Supply Voltage Sensorless Reactive Power Control of DTC Modulation Based Line Converter with L- and LCL-filters" (Abstract only) R. Pollallanen, A. Tarkiaenen, M. Niemelt and J. Pyrnbnen, 2003, in Proc. 10th Eur. Conference On Power Electronics and Applications., 1 pg.

"Control and Design of Microgrid Components", R.H. Lasseter and P. Piagi, Jan. 2006, Power Systems Engineering Research Center Publication 06-03, University of Wisconsin-Madison, 257 pgs.

"Generalized Design, Analysis and Conteol of Grid side Converters with Integrated UPS or Islanding Functionality", Aug. 2006, Srinivas Ponnaluri, Thesis for Master of Engineering, Inc., 159 pgs.

\* cited by examiner

ALTERNATING CURRENT (AC) SYNCHRONIZATION FOR LOAD RESTORATION

BACKGROUND

A power grid, such as an electrical network, provides electrical power for numerous loads, such as residential and/or commercial structures within a municipality. When a grid fault occurs within the power grid, a load can experience an outage, such as a loss of power resulting from the grid fault. The fault may be isolated within the power grid, and additional restoration techniques may be employed to restore power to the load. For example, fault detection, fault isolation, and load restoration (FDIR) functionality may be used to supply power to the load from a non-faulty portion of the power grid, such as a capacitor bank of a non-faulty feeder line that is capable of being electrically coupled to the load.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Among other things, one or more systems and/or techniques for synchronizing one or more direct current (DC) to alternating current (AC) power sources (DC to AC power sources) and/or for restoring power to a load based upon respective synchronized DC to AC power sources are provided herein. It will be appreciated that a DC to AC power source generally corresponds to a scenario where DC power from a DC power source is converted to AC power by an inverter. Accordingly, synchronizing a DC to AC power source may, for example, correspond to synchronizing an AC power source (e.g., a magnitude and/or phase, etc. of the AC power source), where the AC power source results from DC power, from a DC power source, being applied to an inverter.

As provided herein, a common bus connects to a grid, a load (e.g., an end user, a business, a city, a state, etc.), and one or more DC to AC power sources. The grid supplies power to the load over the common bus. If a grid fault occurs, then the one or more DC to AC power sources are synchronized to the common bus so that respective synchronized DC to AC power sources can supply power to the load. It may be appreciated that a DC to AC power source can comprise any type of variable or passive DC source from which AC power is derived. In some embodiments, a DC to AC power source comprises a renewable energy source, such as a fuel cell. In some embodiments, a DC to AC power source corresponds to a DC power source that is coupled to an inverter (e.g., a dual-mode inverter) configured to convert a DC voltage to an AC voltage that can be supplied to the load.

Upon identifying a grid fault associated with the grid, a grid circuit breaker, a load circuit breaker, and/or one or more inverter circuit breakers are opened to isolate the common bus from the load, the one or more DC to AC power sources, and the grid. Accordingly, the one or more DC to AC power sources are synchronized with the common bus (e.g., voltage synchronization, phase synchronization, and/or frequency synchronization) through synchronization circuits. In an example of synchronizing a DC to AC power source comprising a DC power source coupled to an inverter, for example, the DC power source is connected to an inverter circuit breaker over a source bus. The inverter circuit breaker connects the source bus to the common bus (e.g., the inverter circuit breaker may be opened to isolate the source bus from the common bus based upon the grid fault). Responsive to the grid fault, a synchronization circuit between the source bus and the common bus is closed so that the source bus is coupled to the common bus through the synchronization circuit. A source bus voltage of the source bus is iteratively adjusted based upon a common bus voltage of the common bus until the source bus voltage corresponds to the common bus voltage. A source bus phase (e.g., or frequency) is iteratively adjusted based upon a common bus phase of the common bus until the source bus phase corresponds to the common bus phase. Responsive to the source bus voltage and the source bus phase being synchronized with the common bus, the inverter circuit breaker is closed so that the DC to AC power source (e.g., the DC power source and the inverter) is operatively coupled, through the source bus, to the common bus. Thus, the DC to AC power source can supply power to the common bus. In this way, one or more DC to AC power sources are synchronized with the common bus. Responsive to a total power supply provided by respective synchronized DC to AC power sources being greater than or equal to a target power used to supply the load, the load circuit breaker is closed so that the synchronized DC to AC power sources can supply power over the common bus to the load.

The following description and annexed drawings set forth certain illustrative aspects and implementations. These are indicative of but a few of the various ways in which one or more aspects may be employed. Other aspects, advantages, and/or novel features of the disclosure will become apparent from the following detailed description when considered in conjunction with the annexed drawings.

DETAILED DESCRIPTION

Figure 1:
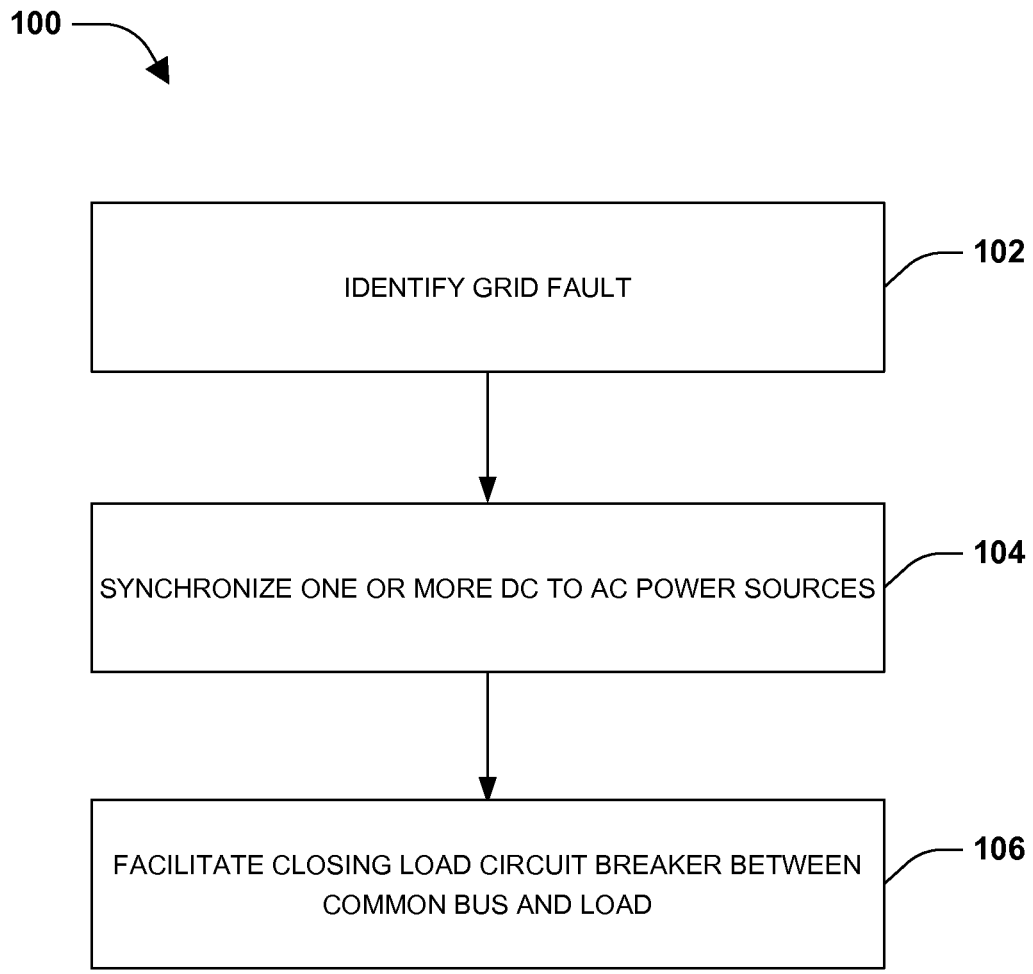
FIG. 1 is a flow diagram illustrating an exemplary method of restoring power to a load based upon one or more direct current (DC) power sources.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. In other instances, structures and devices are illustrated in block diagram form in order to facilitate describing the claimed subject matter.

Figure 2:
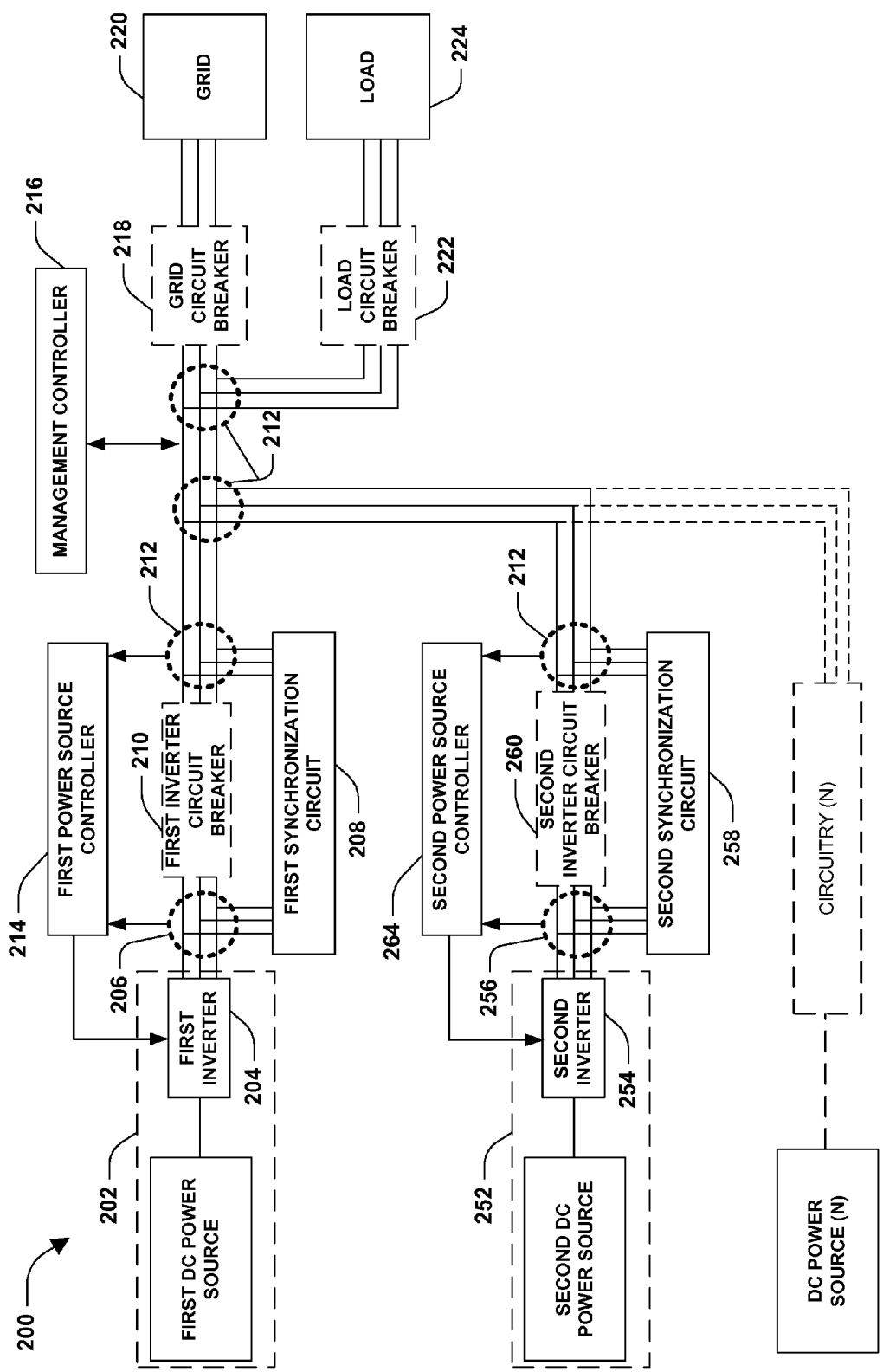
FIG. 2 is an illustration of an example of synchronizing one or more DC to AC power sources.

One embodiment of restoring power to a load based upon one or more direct current (DC) power sources is illustrated by an exemplary method 100 in FIG. 1, and an example 200 of synchronizing one or more DC to AC power sources is illustrated in FIG. 2. A grid 220, such as a power grid, provides power to a load 224 (e.g., an end user, a business, a city, or other load) through a common bus 212. The grid 220 is connected to the common bus 212 through a grid circuit breaker 218. The load 224 is connected to the common bus 212 through a load circuit breaker 222. One or more DC to AC power sources (e.g., a fuel cell, a renewable power source, a DC power source coupled to an inverter, etc.) are connected to the common bus 212 through inverters and/or inverter circuit breakers. In an example, a first DC to AC power source 202 comprises a first DC power source that is connected to a first inverter 204 configured to convert DC power from the first DC power source to AC power supplied to a first source bus 206. The first source bus 206 is coupled to the common bus 212 through a first inverter circuit breaker 210. In another example, a second DC to AC power source 252 comprises a second DC power source that is connected to a second inverter 254 configured to convert DC power from the second DC power source to AC power supplied to a second source bus 256. The second source bus 256 is coupled to the common bus 212 through a second inverter circuit breaker 260. In some embodiments, one or more additional DC to AC power sources are connected to the common bus 212.

At 102, a gird fault associated with the grid 220 is detected. In an example, the grid circuit breaker 218 is opened to isolate the grid 220 from the common bus 212 and the load 224. In another example, the load circuit breaker 222 is opened to isolate the load 224 from the common bus 212. In another example, the first inverter circuit breaker 210, the second inverter circuit breaker 260, and/or other inverter circuit breakers are opened to isolate respective DC to AC power sources from the common bus 212. In this way, the common bus is isolated from the grid 220, the load 224, and the DC to AC power sources based upon the grid fault.

At 104, one or more DC to AC power sources are synchronized until a total power supply provided by respective synchronized DC to AC power sources is greater than or equal to a target power used to supply the load 224 over the common bus 212. In some embodiments, synchronization of the one or more DC to AC power sources may start relatively in parallel, however, respective DC to AC power sources may become synchronized at the same or different times. For example, the second DC to AC power source 252 may finish synchronization first, a fourth DC to AC power source may finish synchronization second, and a sixth DC to AC power source may finish synchronization third, such that power supplied by the second DC to AC power source 252, the fourth DC to AC power source, and the sixth DC to AC power source over the common bus 212 is greater than or equal to the target power used to supply the load 224. Thus, power can be restored to the load 224 before the first DC to AC power source 202 is synchronized, for example.

In some embodiments, the common bus 212 initially does not comprise a voltage or phase because the common bus 212 is isolated from the grid 220, the load 224 and/or respective DC to AC power sources (e.g., when synchronization circuits operatively coupling DC to AC power sources to the common bus 212 are opened). Thus, respective synchronization circuits may be used (e.g., may be closed) to create a voltage and/or a phase on the common bus 212 with which DC to AC power sources may be synchronized. Synchronization is performed to mitigate damage that may occur if the DC to AC power sources were directly connected to one another through the common bus 212 where such DC to AC power sources may be out of phase or have different output voltages, for example.

In an example of synchronizing a DC to AC power source, the first source bus 206, associated with the first DC to AC power source 202, is operatively coupled to the common bus 212 through a first synchronization circuit 208. For example, a switch of the first synchronization circuit 208 is closed to create a path, through a resistor of the first synchronization circuit 208, between the first source bus 206 and the common bus 212. A first source bus voltage of the first source bus 206 (e.g., an AC voltage provided by the first inverter 204 based upon a DC voltage supplied by the first DC power source) is iteratively adjusted based upon a common bus voltage of the common bus 212 until the first source bus voltage corresponds to the common bus voltage. For example, a first power source controller 214 is configured to adjust the first source bus voltage. In an example, the common bus voltage has a variable value during synchronization because the common bus voltage corresponds to an average voltage value supplied by the one or more DC to AC power sources to the common bus 212. In an example of iteratively adjusting the first source bus voltage, a common bus voltage measurement associated with the common bus 212 is obtained. A source bus voltage measurement associated with the first source bus 206 is obtained. Responsive to the common bus voltage measurement being larger than the source bus voltage measurement, the first source bus voltage is increased. Responsive to the common bus voltage measurement being smaller than the source bus voltage measurement, the first source bus voltage is decreased. In this way, the first source bus voltage is iteratively adjusted based upon the common bus 212.

A first source bus phase (e.g., and/or a frequency) of the first source bus 206 is iteratively adjusted based upon a common bus phase (e.g., and/or a frequency) of the common bus 212 until the first source bus phase corresponds to the common bus phase. For example, the first power source controller 214 is configured to adjust the first source bus phase. In an example of iteratively adjusting the first source bus phase, a common bus phase measurement associated with the common bus 212 is obtained. A source bus phase measurement associated with the first source bus 206 is obtained. Responsive to the common bus phase measurement being larger than the source bus phase measurement, the first source bus phase is increased. Responsive to the common bus phase measurement being smaller than the source bus phase measurement, the first source bus phase is decreased. In this way, the first source bus phase is iteratively adjusted based upon the common bus 212.

Responsive to the first source bus voltage and the first source bus phase being synchronized with the common bus 212, the first inverter circuit breaker 210 is closed, thus operatively coupling the first source bus 206 and the common bus 212 so that the first DC to AC power source 202 supplies power to the common bus 212. In an example, the switch of the first synchronization circuit 208 is opened after synchronization. In this way, one or more DC to AC power sources are synchronized with the common bus 212. For example, a second power source controller 264 is configured to synchronize a second source bus voltage and/or a second source bus phase of the second source bus 256 with the common bus voltage 212 through a second synchronization circuit 258.

At 106, responsive to the total power supply, supplied by respective synchronized DC to AC power sources, being greater than or equal to the target power used to supply the load 224, the load circuit breaker is closed so that the synchronized DC to AC power sources supply power to the load 224 over the common bus 212 (e.g., based upon parallel operation by the synchronized DC to AC power sources). For example, the management controller 216 is configured to close the load circuit breaker 222. In some embodiments, the respective synchronized DC to AC power sources comprise at least two DC to AC power sources. In some embodiments, the respective synchronized DC to AC power sources comprise at least two, but fewer than all, available DC to AC power sources that are to be synchronized. In some embodiments, the one or more DC to AC power sources are synchronized without being communicatively coupled to one another, such as by a high-speed communication cable.

Figure 3A:
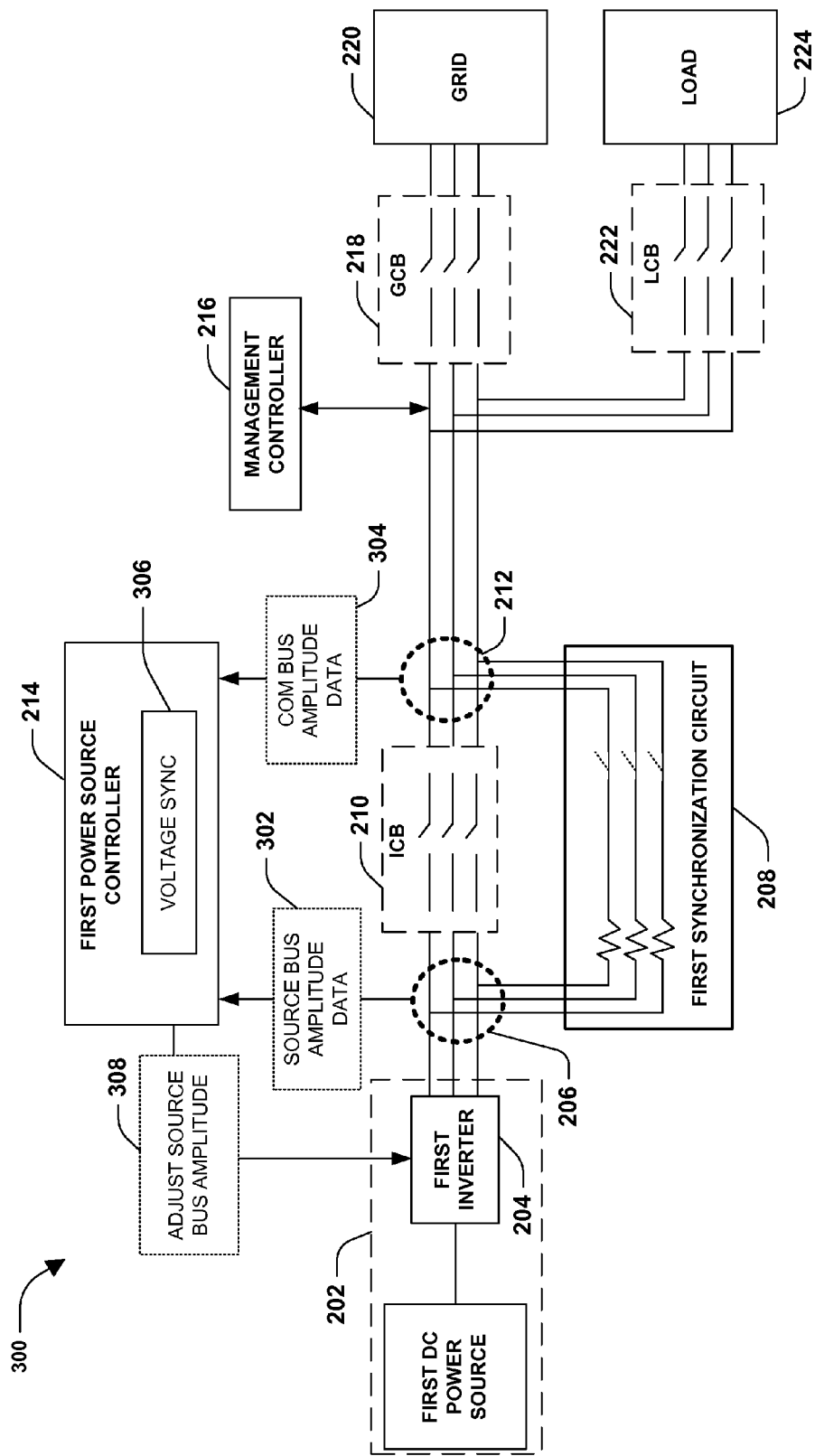
FIG. 3A is a component block diagram illustrating an exemplary system for synchronizing a first DC to AC power source to a common bus.

FIG. 3A illustrates an example of a system 300 for synchronizing a first DC to AC power source 202 to a common bus 212. The system 300 comprises a first power source controller 214, a first synchronization circuit 208, and/or a management controller 216. The management controller 216 may be configured to facilitate opening of a grid circuit breaker 218 and a load circuit breaker 222 based upon a grid fault associated with a grid 220 used to supply power to a load 224 across the common bus 212. Responsive to the grid fault, a first inverter circuit breaker 210 associated with a first inverter 204 of the first DC to AC power source 202 (e.g., a dual-mode inverter configured to convert DC power from the first DC power source to AC power and vice-versa) is opened to isolate the first DC to AC power source 202 from the common bus 212.

The first synchronization circuit 208 comprises a resistor (e.g., a first resistor for a phase A, a second resistor for a phase B, and a third resistor for a phase C) and a switch (e.g., a first switch for the phase A, a second switch for the phase B, and a third switch for the phase C). The switch is configured to close based upon the grid fault. Closing the switch results in the common bus 212 being operatively coupled to a first source bus 206 through the resistor of the first synchronization circuit 208.

The first power source controller 214 is configured to synchronize the first DC to AC power source 202 with the common bus 212. In an example, the first power source controller 214 is configured to perform a voltage synchronization 306 between a first source bus voltage of the first source bus 206 (e.g., an AC voltage converted by the first inverter 204 from a DC voltage output by the first DC power source) and a common bus voltage of the common bus 212 by iteratively adjusting the first source bus voltage until the first source bus voltage corresponds to the common bus voltage. In an example of the voltage synchronization 306, the first power source controller 214 is configured to obtain common bus amplitude data 304 (e.g., a common bus voltage measurement obtained from the common bus 212). The first power source controller 214 is configured to obtain source bus amplitude data 302 (e.g., a first source bus voltage measurement obtained from the first source bus 206). If the common bus voltage measurement is larger than the first source bus voltage measurement, then the first power source controller 214 increases the first source bus voltage (e.g., adjust source bus amplitude 308). If the common bus voltage measurement is smaller than the first source bus voltage measurement, then the first power source controller 214 decreases the first source bus voltage (e.g., adjust source bus amplitude 308). In this way, the first power source controller 214 iteratively adjusts the first source bus voltage until the first source bus voltage corresponds to the common bus voltage. The first power source controller 214 may synchronize a first source bus phase (e.g., and/or a first source bus frequency) of the first source bus 206, as illustrated in FIG. 3B.

Figure 3B:
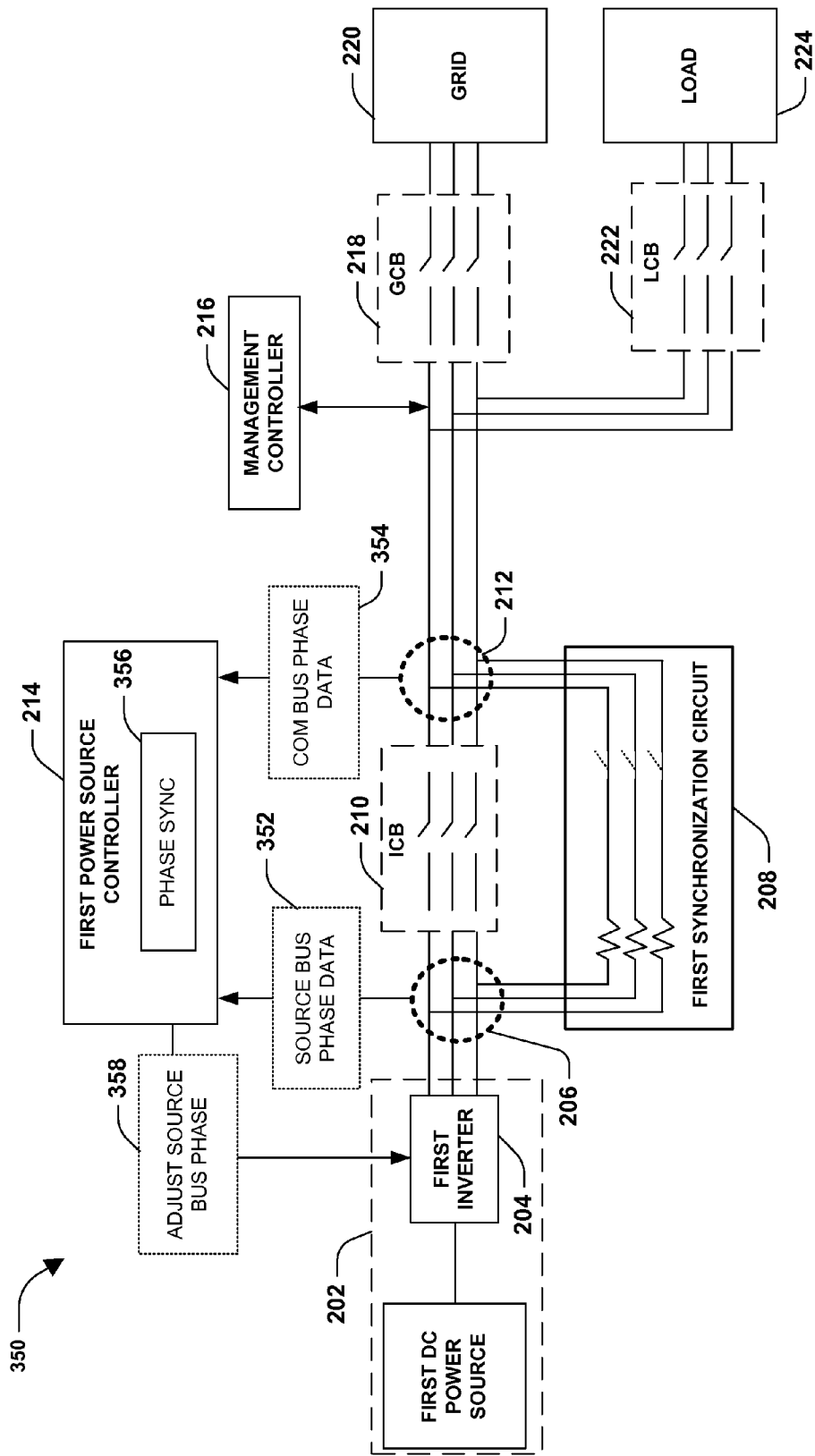
FIG. 3B is a component block diagram illustrating an exemplary system for synchronizing a first DC to AC power source to a common bus.

FIG. 3B illustrates an example of a system 350 for synchronizing a first DC to AC power source 202 to a common bus 212. In some embodiments, a first source bus voltage of a first source bus 206 associated with the first DC to AC power source 202 is synchronized with a common bus voltage of the common bus 212, as illustrated in FIG. 3A. The system 350 comprises a first power source controller 214. The first power source controller 214 is configured to synchronize the first DC to AC power source 202 with the common bus 212. In an example, the first power source controller 214 is configured to perform a phase synchronization 356 (e.g., and/or a frequency synchronization) between a first source bus phase of the source bus 206 (e.g., an AC phase or frequency converted by the first inverter 204 from a DC phase or frequency output by the first DC power source) and a common bus phase of the common bus 212 by iteratively adjusting the first source bus phase until the first source bus phase corresponds to the common bus phase. In an example of the phase synchronization 356, the first power source controller 214 is configured to obtain common bus phase data 354 (e.g., a common bus phase measurement obtained from the common bus 212). The first power source controller 214 is configured to obtain source bus phase data 352 (e.g., a first source bus phase measurement obtained from the first source bus 206). If the common bus phase measurement is larger than the first source bus phase measurement, then the first power source controller 214 increases the first source bus phase (e.g., adjust source bus phase 358). If the common bus phase measurement is smaller than the first source bus phase measurement, then the first power source controller 214 decreases the first source bus phase (e.g., adjust source bus phase 358). In this way, the first power source controller 214 iteratively adjusts the first source bus phase until the first source bus phase corresponds to the common bus phase.

Figure 3C:
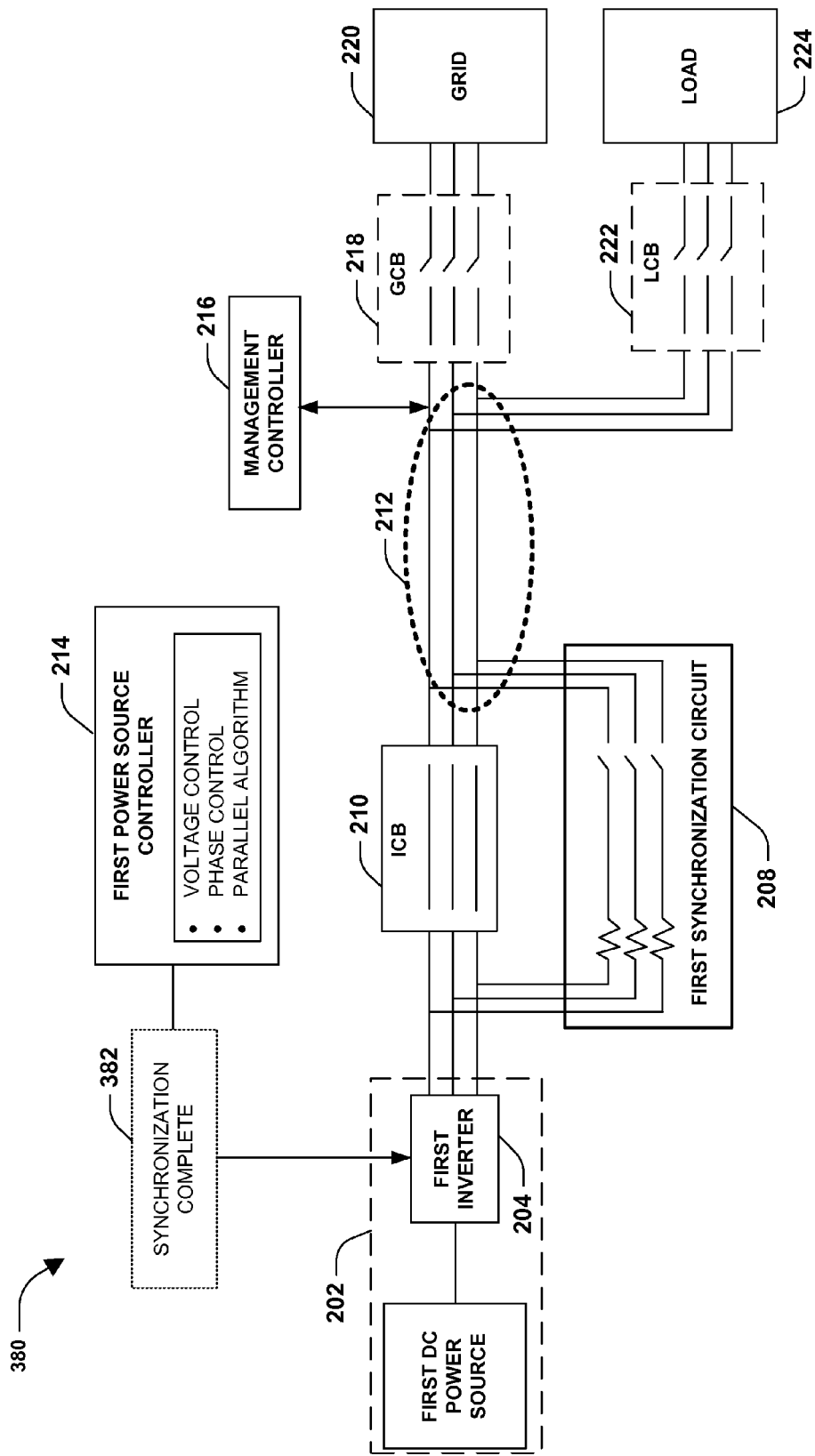
FIG. 3C is an illustration of an example of a first DC to AC power source synchronized with a common bus.

FIG. 3C illustrates an example of a first DC to AC power source 202 synchronized with a common bus 212. In some embodiments, a first source bus voltage and/or a first source bus phase associated with the first DC to AC power source 202 is synchronized with a common bus voltage and/or a common bus phase of the common bus 212, as illustrated in FIGS. 3A and 3B respectively. A first power source controller 214 may be configured to perform voltage control, phase control, and/or execute a parallel algorithm (e.g., parallel functionality configured to operate the first DC to AC power source 202 in parallel with one or more synchronized DC to AC power sources in order to supply power to a load 224). Upon synchronization completion 382 of the first DC to AC power source 202, a first inverter circuit breaker 210 is closed to operatively couple the first DC to AC power source 202 to the common bus 212. A switch of a first synchronization circuit 208 is opened so that the first DC to AC power source 202 is not operatively coupled to the common bus 212 through the first synchronization circuit 208. In this way, the first DC to AC power source 202 provides power to the common bus 212 through the first inverter circuit breaker 210.

Figure 3D:
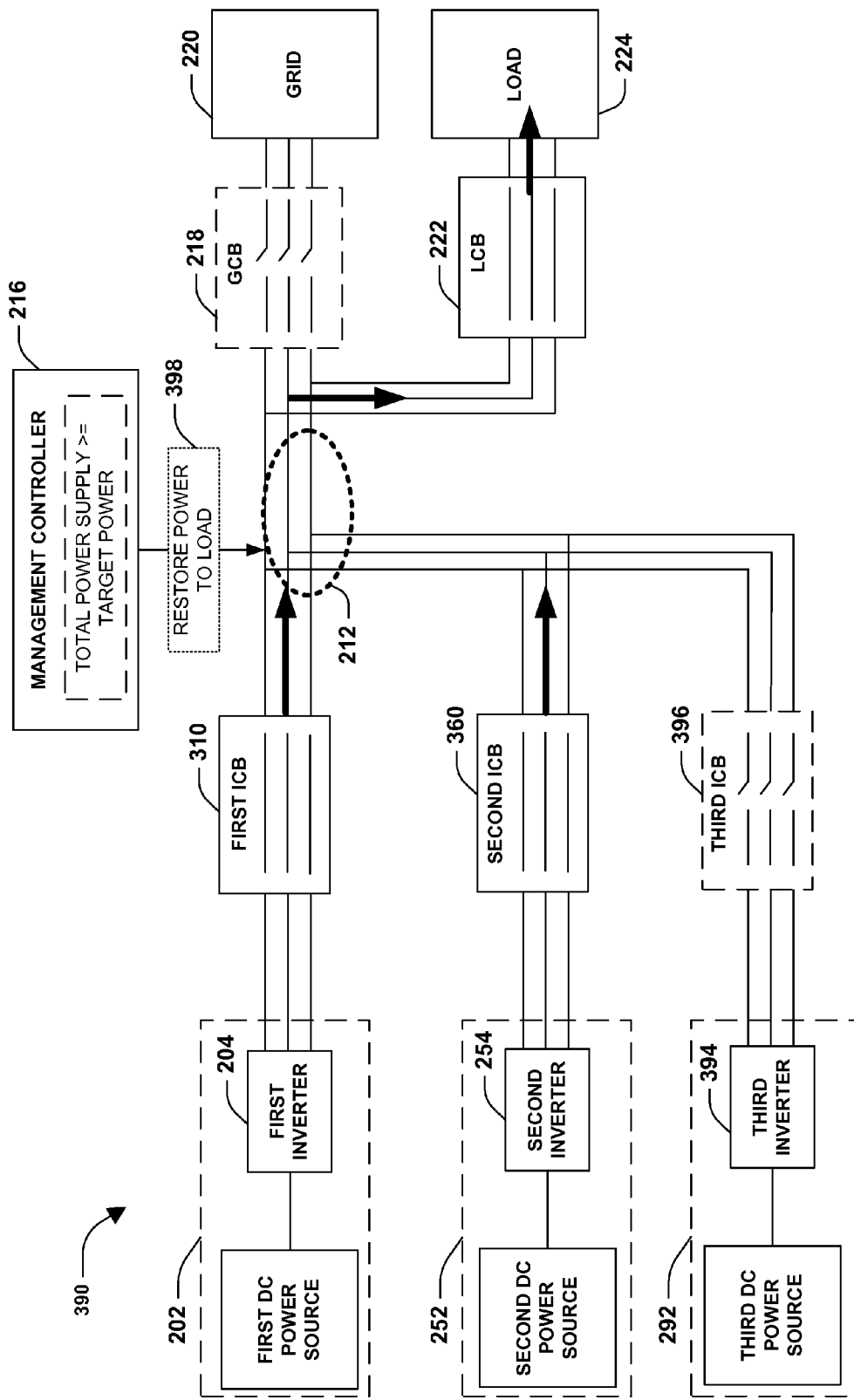
FIG. 3D is an illustration of an example of restoring power to a load based upon one or more DC to AC power sources.

FIG. 3D illustrates an example 390 of restoring power to a load 224 based upon one or more DC to AC power sources. A first DC to AC power source 202 and a second DC to AC power source 252 may be synchronized with a common bus 212 (e.g., voltage, phase, and/or frequency synchronization) responsive to identification of a grid fault associated with a grid 220 configured to power a load 224 (e.g., a grid circuit breaker 218 may be opened to isolate the common bus 212 and the load 224 from the grid 220). Because the first DC to AC power source 202 is synchronized, a first inverter circuit breaker 310 is closed so that the first DC to AC power source 202 is operatively coupled to the common bus 212 through the first inverter circuit breaker 210. Because the second DC to AC power source 252 is synchronized, a second inverter circuit breaker 360 is closed so that the second DC to AC power source 252 is operatively coupled to the common bus 212 through the second inverter circuit breaker 360. Because a third DC to AC power source 392 is not yet synchronized with the common bus 212 (e.g., synchronization of the third DC to AC power source 392 may be currently underway, but not yet completed), a third inverter circuit breaker 396 is opened to isolate the third DC to AC power source 392 from the common bus 212 (e.g., during synchronization, the third DC to AC power source 392 may be operatively coupled to the common bus 212 through the third inverter circuit breaker 396 and a synchronization circuit not illustrated).

A management controller 216 is configured to compare a target power value used to supply the load 224 (e.g., a threshold amount of power that can adequately power the load 224) with a total power supply provided by respective synchronized DC to AC power sources, such as the first DC to AC power source 202 and the second DC to AC power source 252, over the common bus 212. Responsive to the total power supply being greater than or equal to the target power, the management controller 216 restores 398 power to the load 224 by facilitating closing of the load circuit breaker 222 between the common bus 212 and the load 224. In this way, DC power from the first DC power source is converted into AC power by the first inverter 204, and is provided to the load 224 over the common bus 212. DC power from the second DC power source is converted into AC power by the second inverter 254, and is provide to the load 224 over the common bus 212. In an example, synchronization of the third DC to AC power source 392 is continued until completion, such that DC power from the third DC power source is converted into AC power by the third inverter 394, and is provided to the load 224 over the common bus 212.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims.

Many modifications may be made to the instant disclosure without departing from the scope or spirit of the claimed subject matter. Further, unless specified otherwise, "first," "second," or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally to be construed to mean "one or more" unless specified otherwise or clear from context to be directed to a singular form. Also, at least one of A and B or the like generally means A or B or both A and B. Furthermore, to the extent that "includes", "having", "has", "with", or variants thereof are used in either the detailed description or the claims, such terms are intended to be inclusive in a manner similar to "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims.

What is claimed is:

1. A method for restoring power to a load based upon one or more direct current (DC) power sources, comprising:
    identifying a grid fault associated with a grid used to supply power to a load across a common bus;
    synchronizing one or more DC to AC power sources until a total power supply provided by respective synchronized DC to AC power sources is greater than or equal to a target power used to supply the load, the synchronizing comprising:
        for respective DC to AC power sources coupled to the common bus:
            operatively coupling a source bus and the common bus through a synchronization circuit, the source bus associated with a DC to AC power source;
            iteratively adjusting a source bus voltage of the source bus, supplied by the DC to AC power source, based upon a common bus voltage of the common bus until the source bus voltage corresponds to the common bus voltage;
            iteratively adjusting a source bus phase of the source bus, supplied by the DC to AC power source, based upon a common bus phase of the common bus until the source bus phase corresponds to the common bus phase; and
            responsive to synchronizing the source bus voltage and the source bus phase with the common bus, facilitating closing of an inverter circuit breaker that operably couples the DC to AC power source and the common bus; and
    responsive to the total power supply being greater than or equal to the target power, facilitating closing of a load circuit breaker between the common bus and the load.

2. The method of claim 1, the identifying a grid fault comprising:
    facilitating opening a grid circuit breaker and the load circuit breaker to isolate the common bus from the grid and the load.

3. The method of claim 1, the identifying a grid fault comprising:
    facilitating opening the inverter circuit breaker to isolate the DC to AC power source from the common bus.

4. The method of claim 1, the common bus voltage having a variable value during the synchronizing, the common bus voltage corresponding to an average voltage value supplied by the one or more DC to AC power sources to the common bus.

5. The method of claim 1, the operatively coupling a source bus comprising:
    closing a switch of the synchronization circuit to create a path, through a resistor, between the source bus and the common bus.

6. The method of claim 1, comprising:
    adjusting a voltage droop characteristic associated with the DC to AC power source.

7. The method of claim 1, comprising:
    adjusting a phase droop characteristic associated with the DC to AC power source.

8. The method of claim 1, the DC to AC power source not communicatively coupled to a second DC to AC power source during the synchronization.

9. The method of claim 1, the facilitating closing of a load circuit breaker comprising:
    providing power to the load based upon parallel operation of at least two DC to AC power sources.

10. The method of claim 1, the iteratively adjusting a source bus voltage comprising:
  obtaining a common bus voltage measurement associated with the common bus;
  obtaining a source bus voltage measurement associated with the source bus;
  responsive to the common bus voltage measurement being larger than the source bus voltage measurement, increasing the source bus voltage; and
  responsive to the common bus voltage measurement being smaller than the source bus voltage measurement, decreasing the source bus voltage.

11. The method of claim 1, the iteratively adjusting a source bus phase comprising:
  obtaining a common bus phase measurement associated with the common bus;
  obtaining a source bus phase measurement associated with the source bus;
  responsive to the common bus phase measurement being larger than the source bus phase measurement, increasing the source bus phase; and
  responsive to the common bus phase measurement being smaller than the source bus phase measurement, decreasing the source bus phase.

12. The method of claim 1, the facilitating closing of a load circuit breaker comprising:
  facilitating closing of the load circuit breaker when at least two, but fewer than all, of the one or more DC to AC power sources are synchronized.

13. The method of claim 1, the DC to AC power source comprising a DC power source coupled to an inverter.

14. A system for restoring power to a load based upon one or more direct current (DC) power sources, comprising:
  a synchronization circuit operatively coupling a common bus and a source bus associated with a DC to AC power source, the synchronization circuit comprising a resistor and a switch configured to close based upon a grid fault associated with a grid used to supply power to a load across the common bus; and
  a power source controller configured to:
    synchronize the DC to AC power source with the common bus, comprising:
      iteratively adjusting a source bus voltage of the source bus, supplied by the DC to AC power source, based upon a common bus voltage of the common bus until the source bus voltage corresponds to the common bus voltage; and
      iteratively adjusting a source bus phase of the source bus, supplied by the DC to AC power source, based upon a common bus phase of the common bus until the source bus phase corresponds to the common bus phase; and
    responsive to synchronizing the DC to AC power source, facilitate closing of an inverter circuit breaker operatively coupling the source bus to the common bus.

15. The system of claim 14, comprising:
  a management controller configured to:
    close a load circuit breaker between the load and the common bus based upon a total power supply, provided by one or more synchronized DC to AC power sources, being greater than or equal to a target power used to supply the load.

16. The system of claim 14, the power source controller configured to:
  obtain a common bus voltage measurement associated with the common bus;
  obtain a source bus voltage measurement associated with the source bus;
  responsive to the common bus voltage measurement being larger than the source bus voltage measurement, increase the source bus voltage; and
  responsive to the common bus voltage measurement being smaller than the source bus voltage measurement, decrease the source bus voltage.

17. The system of claim 14, the power source controller configured to:
  obtain a common bus phase measurement associated with the common bus;
  obtain a source bus phase measurement associated with the source bus;
  responsive to the common bus phase measurement being larger than the source bus phase measurement, increase the source bus phase; and
  responsive to the common bus phase measurement being smaller than the source bus phase measurement, decrease the source bus phase.

18. A method for synchronizing a DC to AC power source, comprising:
  identifying a grid fault associated with a grid used to supply power to a load across a common bus;
  facilitating opening of an inverter circuit breaker operatively coupling the common bus and a source bus associated with a DC to AC power source;
  synchronizing the DC to AC power source with the common bus, comprising:
    iteratively adjusting a source bus voltage of the source bus, supplied by the DC to AC power source, based upon a common bus voltage of the common bus until the source bus voltage corresponds to the common bus voltage; and
    iteratively adjusting a source bus phase of the source bus, supplied by the DC to AC power source, based upon a common bus phase of the common bus until the source bus phase corresponds to the common bus phase; and
  responsive to synchronizing the DC to AC power source, facilitating closing of the inverter circuit breaker.

19. The method of claim 18, comprising:
  synchronizing one or more DC to AC power sources until a total power supply provided by at least some of the one or more synchronized DC to AC power sources is greater than or equal to a target power used to supply the load; and
  responsive to the total power supply being greater than or equal to the target power, facilitating closing of a load circuit breaker between the common bus and the load.

20. The method of claim 18, comprising:
  adjusting at least one of a voltage droop characteristic or a phase droop characteristic associated with the DC to AC power source.

* * * * *